United States Patent
Li et al.

(10) Patent No.: US 9,152,429 B2
(45) Date of Patent: Oct. 6, 2015

(54) COMPUTER SYSTEM HAVING A NEAR FIELD COMMUNICATION TAG WITH USER IDENTIFICATION FUNCTION

(71) Applicant: Quanta Computer Inc., Tao Yuan Shien (TW)

(72) Inventors: Chi-Li Li, Taoyuan County (TW); Fang-Cing Su, Taoyuan County (TW); Chun-Hao Lien, Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 305 days.

(21) Appl. No.: 13/896,942

(22) Filed: May 17, 2013

(65) Prior Publication Data
US 2014/0223154 A1    Aug. 7, 2014

(30) Foreign Application Priority Data
Feb. 6, 2013 (TW) .............................. 102104665 A

(51) Int. Cl.
G06F 9/44 (2006.01)
H04W 4/00 (2009.01)

(52) U.S. Cl.
CPC .............. G06F 9/4401 (2013.01); *H04W 4/008* (2013.01)

(58) Field of Classification Search
CPC .................................................... G06F 9/4401
USPC ............................................................. 713/2
See application file for complete search history.

(56) References Cited

U.S. PATENT DOCUMENTS

| | | | | |
|---|---|---|---|---|
| 6,892,052 B2* | 5/2005 | Kotola et al. | ................. | 455/41.2 |
| 7,703,035 B1* | 4/2010 | Swayne | ...................... | 715/773 |
| 7,797,535 B2* | 9/2010 | Sakai | ............................. | 713/168 |
| 8,462,734 B2* | 6/2013 | Laine et al. | .................... | 370/331 |
| 8,880,055 B1* | 11/2014 | Clement et al. | ................ | 455/420 |
| 2003/0149866 A1* | 8/2003 | Neuman et al. | ................... | 713/1 |
| 2003/0200445 A1* | 10/2003 | Park | .............................. | 713/185 |
| 2004/0128389 A1* | 7/2004 | Kopchik | ....................... | 709/228 |
| 2008/0057876 A1* | 3/2008 | Hsia et al. | ........................ | 455/69 |

(Continued)

FOREIGN PATENT DOCUMENTS

| | | |
|---|---|---|
| TW | 201011482 A | 3/2010 |
| TW | 201301068 A | 1/2013 |

OTHER PUBLICATIONS

Huang et al, Non-contact supply control system and method thereof, Mar. 16, 2010, English translation of TW201011482(A), pp. 1-14.*

(Continued)

*Primary Examiner* — Suresh Suryawanshi
(74) *Attorney, Agent, or Firm* — Rabin & Berdo, P.C.

(57) ABSTRACT

A computer system is disclosed. The computer system comprises a near field communication (NFC) tag and a computer. The computer comprises a flash read only memory (ROM), a chipset, an NFC module and a central processing unit (CPU). The flash ROM stores a basic input/output system (BIOS) having a default user identification (UID) and a default entry key data. The chipset comprises a keyboard buffer. The NFC module reads a UID seed from the NFC tag when the NFC tag is close to the NFC module. The CPU generates a current UID according to the UID seed and a function, and determines whether the current UID is equal to the UID. The CPU writes the default entry key data to the keyboard buffer if the current UID is equal to the UID.

8 Claims, 5 Drawing Sheets

(56) References Cited

U.S. PATENT DOCUMENTS

| | | | |
|---|---|---|---|
| 2010/0099354 A1* | 4/2010 | Johnson | 455/41.1 |
| 2013/0023258 A1* | 1/2013 | Choi et al. | 455/418 |
| 2014/0073300 A1* | 3/2014 | Leeder et al. | 455/416 |
| 2014/0145823 A1* | 5/2014 | Aase | 340/5.61 |
| 2014/0181686 A1* | 6/2014 | Shin et al. | 715/748 |

OTHER PUBLICATIONS

Damien McFerran, How to use NFC tags with your Android mobile phone, May 31, 2012, pp. 1-10.*

* cited by examiner

COMPUTER SYSTEM HAVING A NEAR FIELD COMMUNICATION TAG WITH USER IDENTIFICATION FUNCTION

This application claims the benefit of Taiwan application Serial No. 102104665, filed Feb. 6, 2013, the subject matter of which is incorporated herein by reference.

BACKGROUND OF THE INVENTION

1. Field of the Invention

The invention relates in general to an electronic apparatus, and more particularly to a computer system.

2. Description of the Related Art

During the boot process, the computer will load in many option ROM codes such as redundant array of independent disks (RAID), management engine (ME) or local area network (LAN). Each option ROM programming code has a corresponding hot key. The user must key in the corresponding hot key if the user would like to change the firmware setting.

As the efficiency of the computer keeps improving, the computer boot time gets shorter and shorter, and may even become too short for the user to press a hot key to change the firmware setting. In addition, after the computer enters the operating system, the operating system and the application program may ask the user to input login data such as account or password. The above process is very inconvenient to the user in terms of operation.

SUMMARY OF THE INVENTION

The invention is directed to a computer system and a control method thereof, which improves conventional method of manual input by using a near field communication (NFC) tag and an NFC module and makes user operation more convenient.

According to an embodiment of the present invention, a computer system is disclosed. The computer system comprises a near field communication (NFC) tag and a computer. The computer comprises a flash ROM, a chipset, an NFC module and a central processing unit (CPU). The flash ROM stores a basic input/output system (BIOS) having a default user identification (UID) and a default entry key data. The chipset comprises a keyboard buffer. The NFC module reads a UID seed from the NFC tag when the NFC tag is close to the NFC module. The CPU generates a current UID according to the UID seed and a hash function, and determines whether the current UID is equal to the UID. The CPU writes the default entry key data to the keyboard buffer if the current UID is equal to the UID.

The above and other aspects of the invention will become better understood with regard to the following detailed description of the preferred but non-limiting embodiment (s). The following description is made with reference to the accompanying drawings.

DETAILED DESCRIPTION OF THE INVENTION

First Embodiment

Figure 1:
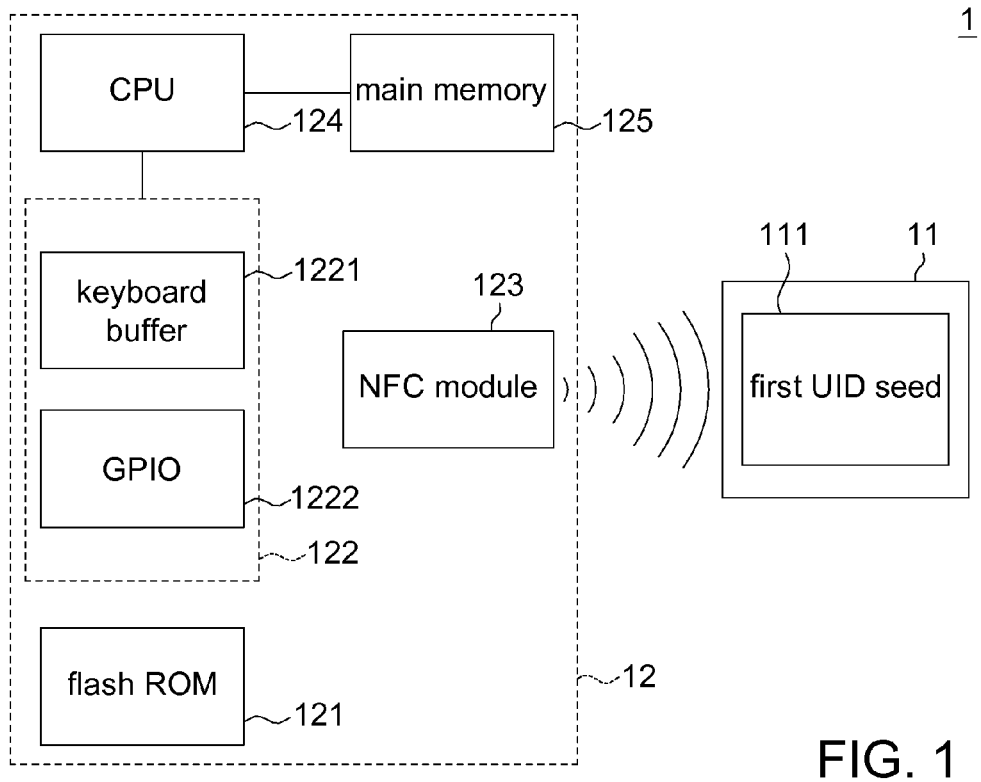
FIG. 1 shows a block diagram of a computer system according to a first embodiment of the invention.
Figure 2:
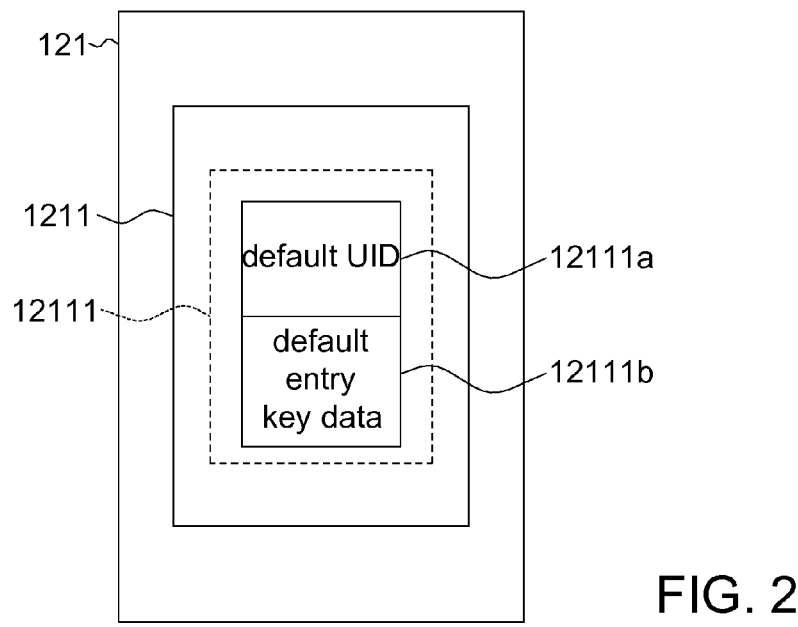
FIG. 2 shows a schematic diagram of a flash ROM according to a first embodiment of the invention.

Referring to FIG. 1 and FIG. 2. FIG. 1 shows a block diagram of a computer system according to a first embodiment of the invention. FIG. 2 shows a schematic diagram of a flash ROM according to a first embodiment of the invention. The computer system 1 comprises a near field communication (NFC) tag 11 and a computer 12 such as a server, a desktop computer, a tablet PC, a notebook or an ultrabook. The near field communication (NFC) tag 11 comprises a first user identification (UID) seed 111. The computer 12 comprises a flash read only memory (ROM) 121, a chipset 122, an NFC module 123, a central processing unit (CPU) 124 and a main memory 125. The chipset 122 comprises a keyboard buffer 1221 and a general purpose input/output (GPIO) 1222. The chipset 122 couples the CPU 124, the flash ROM 121 and the NFC module 123. The main memory 125 is coupled to the CPU 124. The chipset 122 communicates with the NFC module 123 such as through a system management bus (SMBus).

The flash ROM 121 stores a basic input/output system (BIOS) 1211 having a near field communication (NFC) tag data 12111. The NFC tag data 12111 comprises a default user identification (UID) 12111a, and a default entry key data 12111b. The default entry key data 12111b is such as a hot key of BIOS setting, a hot key, account or password of an option ROM code, an account or password of an application program, or an account or password of an operating system. The NFC tag data 12111 can be stored with encryption.

The option ROM code is such as an option ROM code of a redundant array of independent disks (RAID), a management engine (ME) or a local area network (LAN). Each option ROM programming code has a corresponding hot key. After inputting a hot key, the user enters a setting screen of the option ROM programming code. After inputting the account or password, the user can adjust the option items provided by the option ROM programming code.

The CPU 124 determines whether the NFC tag 11 is close to the NFC module 123. The NFC module 123 reads a first UID seed 111 from the NFC tag 11 if the NFC tag 11 is close to the NFC module 123. The CPU 123 generates a current UID according to the first UID seed 111 and a hash function, and determines whether the current UID is equal to the UID. The CPU writes the default entry key data 12111b to the keyboard buffer 1221 if the current UID is equal to the UID.

Figure 3:
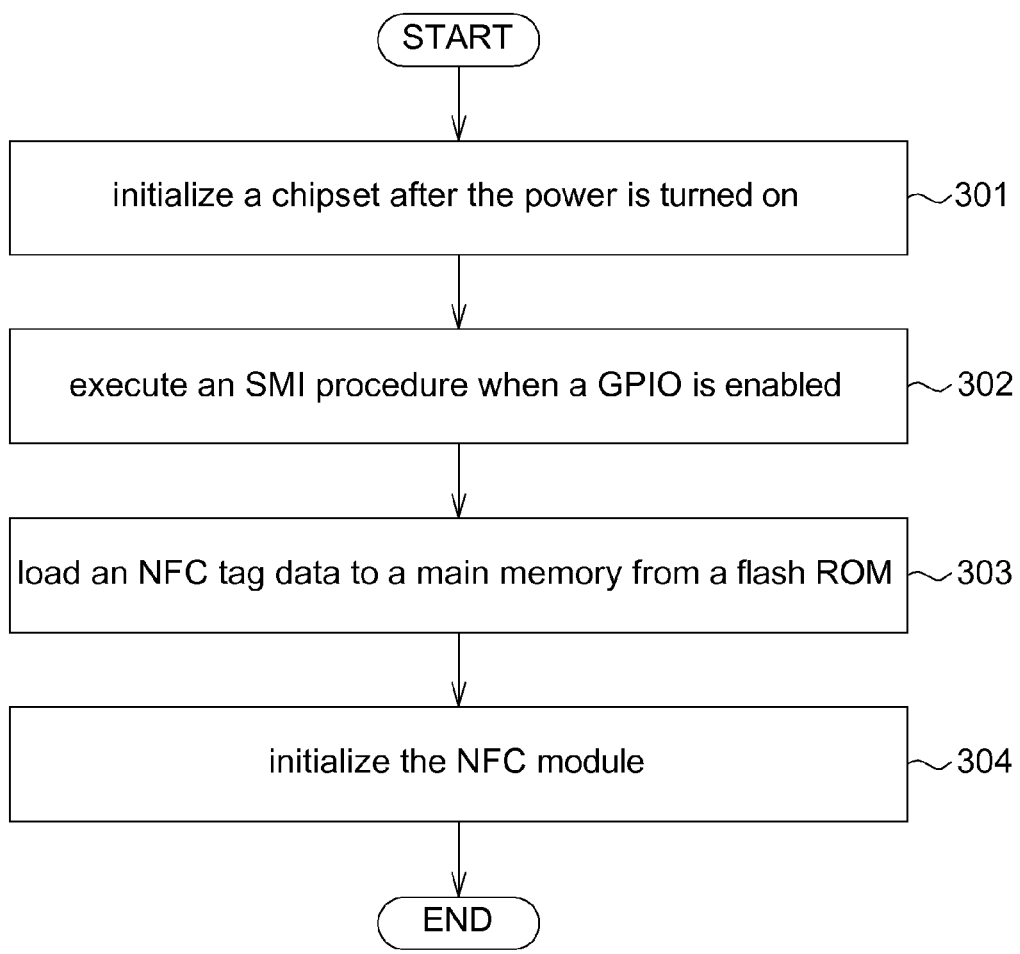
FIG. 3 shows a process of initializing an NFC module.

Referring to FIG. 1, FIG. 2 and FIG. 3. FIG. 3 shows a process of initializing an NFC module. Firstly, the process begins at step 301, the chipset 122 is initialized after the power is turned on. Next, the process proceeds to step 302, a system management interrupt (SMI) procedure is executed when the GPIO 1222 is enabled. Then, the process proceeds to step 303, the NFC tag data 12111 is loaded to the main memory 125 from the flash ROM 121. Then, the process proceeds to step 304, the NFC module 123 is initialized.

Figure 4:
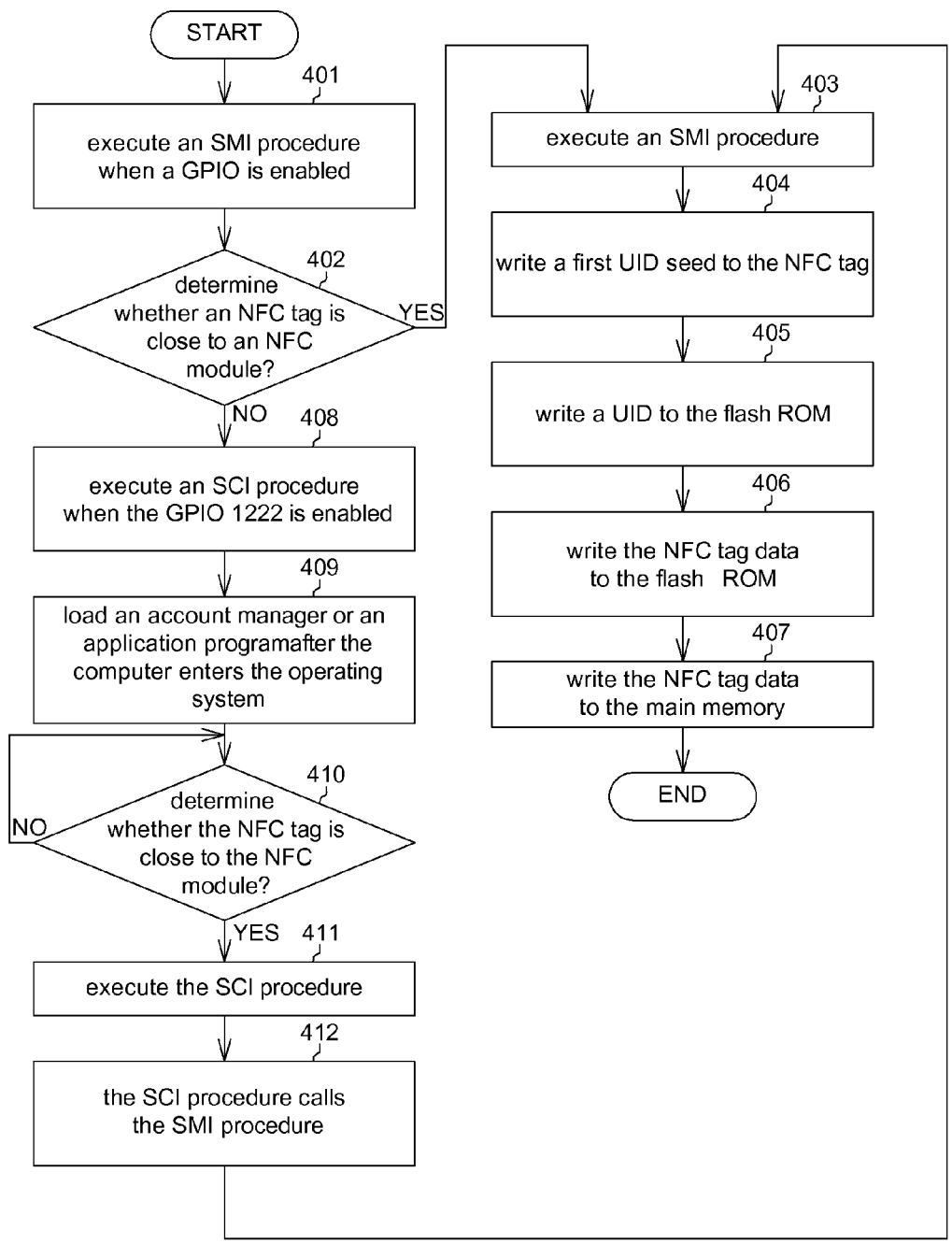
FIG. 4 shows a process of initializing an NFC tag according to a first embodiment of the invention.

Referring to FIG. 1, FIG. 2 and FIG. 4. FIG. 4 shows a process of initializing an NFC tag according to a first embodiment of the invention. Normally, the process of initializing the NFC module 123 must be completed (FIG. 3) before the NFC tag is initialized. Firstly, the process begins at step 401, an SMI procedure is executed when the GPIO 1222 is enabled. Next, the process proceeds to step 402, whether the NFC tag 11 is close to the NFC module 123 is determined. The process proceeds to step 403 if the NFC tag 11 is close to the NFC module 123, and proceeds to step 408 if the NFC tag 11 is not close to the NFC module 123. In step 403, the CPU 124 executes an SMI procedure. The NFC module 123 enables the GPIO 1222 if the NFC tag 11 is close to the NFC module 123. The CPU 124 executes the SMI procedure after the GPIO 1222 is enabled. Then, the process proceeds to step 404, a first user identification (UID) seed 111 is written to the NFC tag 11. Then, the process proceeds to step 405, the UID 12111a is written to the flash ROM 121. Then, the process proceeds to step 406, the NFC tag data 12111 is written to the flash ROM 121. Then, the process proceeds to step 407, the NFC tag data 12111 is written to the main memory 125.

In step 408, a system control interrupt (SCI) procedure is executed when the GPIO 1222 is enabled. Then, the process proceeds to step 409, an account manager or an application program is loaded after the computer enters the operating system. Then, the process proceeds to step 410, whether the NFC tag 11 is close to the NFC module 123 is determined. The process proceeds to step 411 if the NFC tag 11 is close to the NFC module 123, and executes step 410 again if the NFC tag 11 is not close to the NFC module 123. In step 411, the CPU 124 executes the SCI procedure. Then, the process proceeds to step 412, the SCI procedure calls the SMI procedure. The process proceeds to step 403 after step 412 is completed,.

Figure 5:
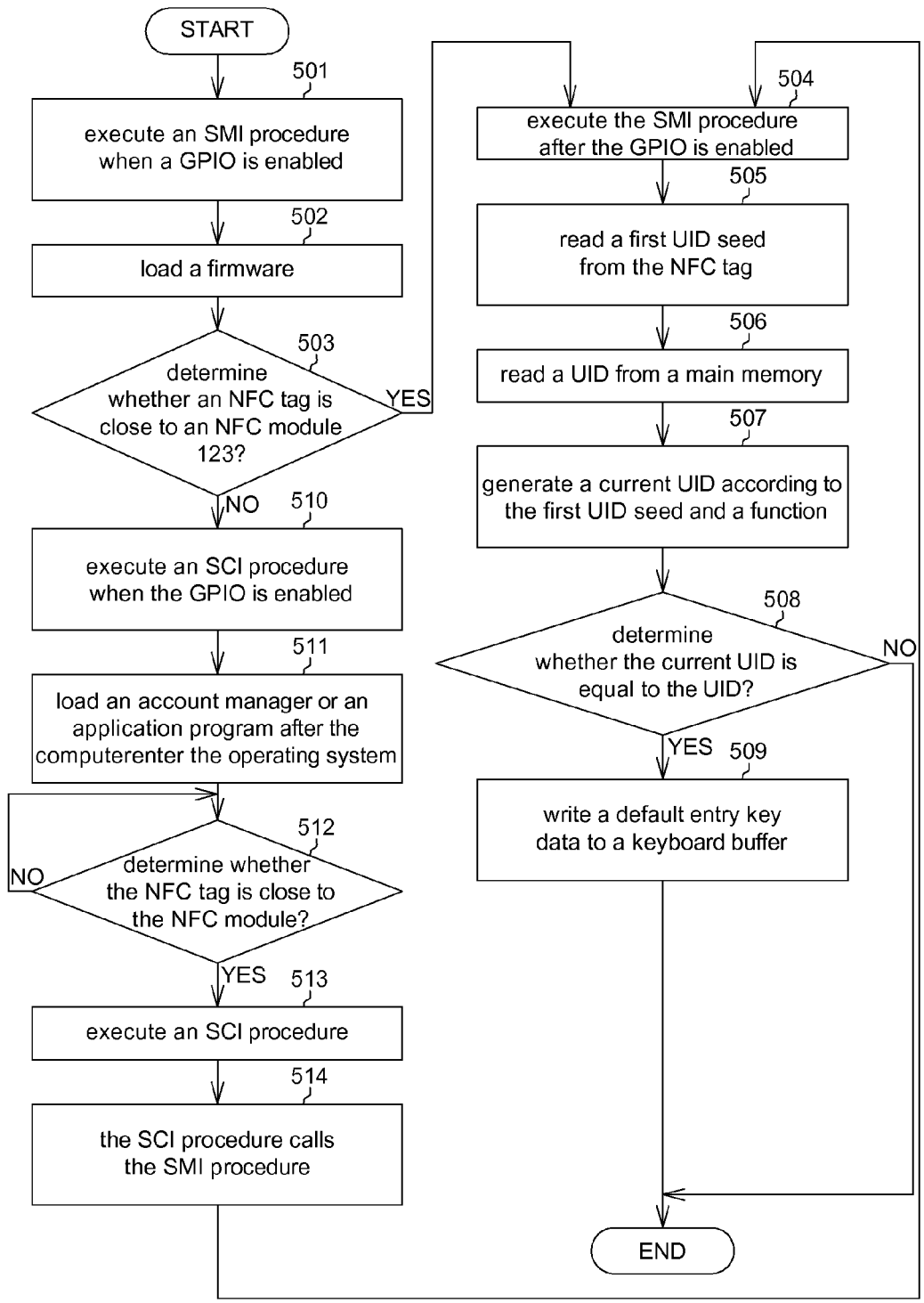
FIG. 5 shows a process of a control method of a computer system according to a first embodiment of the invention.

Referring to FIG. 1, FIG. 2 and FIG. 5. FIG. 5 shows a process of a control method of a computer system according to a first embodiment of the invention. Normally, before the control method of the computer system 1 is executed, the process of initializing the NFC module 123 (FIG. 3) and the process of the NFC tag 11 (FIG. 4) must first be completed. Firstly, the process begins at step 501, an SMI procedure is executed when the GPIO 1222 is enabled. Next, the process proceeds to step 502, a firmware such as a BIOS setting or an option ROM programming code is loaded. Then, the process proceeds to step 503, whether the NFC tag 11 is close to the NFC module 123 is determined. The method proceeds to step 504 if the NFC tag 11 is close to the NFC module 123, and proceeds to step 510 if the NFC tag 11 is not close to the NFC module 123. In step 504, the CPU 124 executes the SMI procedure after the GPIO 1222 is enabled. The NFC module 123 enables the GPIO 1222 if the NFC tag 11 is close to the NFC module 123.

Then, the process proceeds to step 505, the NFC module 123 reads a first UID seed 111 from the NFC tag 11. Then, the process proceeds to step 506, a UID 12111a is read from the main memory 125. Then, the process proceeds to step 507, the CPU 124 generates a current UID according to the first UID seed 111 and a function, such as a hash function. Then, the process proceeds to step 508, the CPU 124 determines whether the current UID is equal to the UID 12111a. The method proceeds to step 509 if the current UID is equal to the UID 12111a, and terminates if the current UID is not equal to the UID 12111a. In step 509, the CPU 124 writes the default entry key data 12111b to the keyboard buffer 1221. The process terminates after step 509 is completed. If the loaded firmware is the BIOS setting, then the default entry key data 12111b is a hot key of the BIOS setting. If the loaded firmware is an option ROM programming code, then the default entry key data 12111b is a hot key, account or password of the option ROM programming code. The default entry key data 12111b will automatically be written to the keyboard buffer 1221 to replace the conventional manual input if the NFC tag 11 is close to the NFC module 123 and recognition is successful. By doing so, the boot time will not be too short for the user to press a hot key during the boot process. As the user does not need to remember the hot key, account or password of each option ROM programming code, operation convenience is greatly improved.

In step 510, an SCI procedure is executed when the GPIO 1222 is enabled. Then, the process proceeds to step 511, an account manager or an application program is loaded after the computer enters the operating system. Then, the process proceeds to step 512, whether the NFC tag 11 is close to the NFC module 123 is determined. The method proceeds to step 513 if the NFC tag 11 is close to the NFC module 123, and executes step 512 again if the NFC tag 11 is not close to the NFC module 123. In step 513, the CPU 124 executes the SCI procedure. Then, the process proceeds to step 514, the SCI procedure calls an SMI procedure. The process proceeds to step 504 after step 514 is completed. If an account manager is loaded in step 511, then the default entry key data 12111b is an account or password of the operating system. If an application program is loaded in step 511, then the default entry key data 12111b is an account or password of the application program. After the computer 12 enters the operating system, the default entry key data 12111b will automatically be written to the keyboard buffer 1221 to replace the conventional manual input if the NFC tag 11 is close to the NFC module 123 and recognition is successful. By doing so, the boot time will not be too short for the user to press a hot key during the boot process. As the user does not need to remember the hot key, account or password of each option ROM programming code, operation convenience is greatly improved.

Second Embodiment

Figure 6:
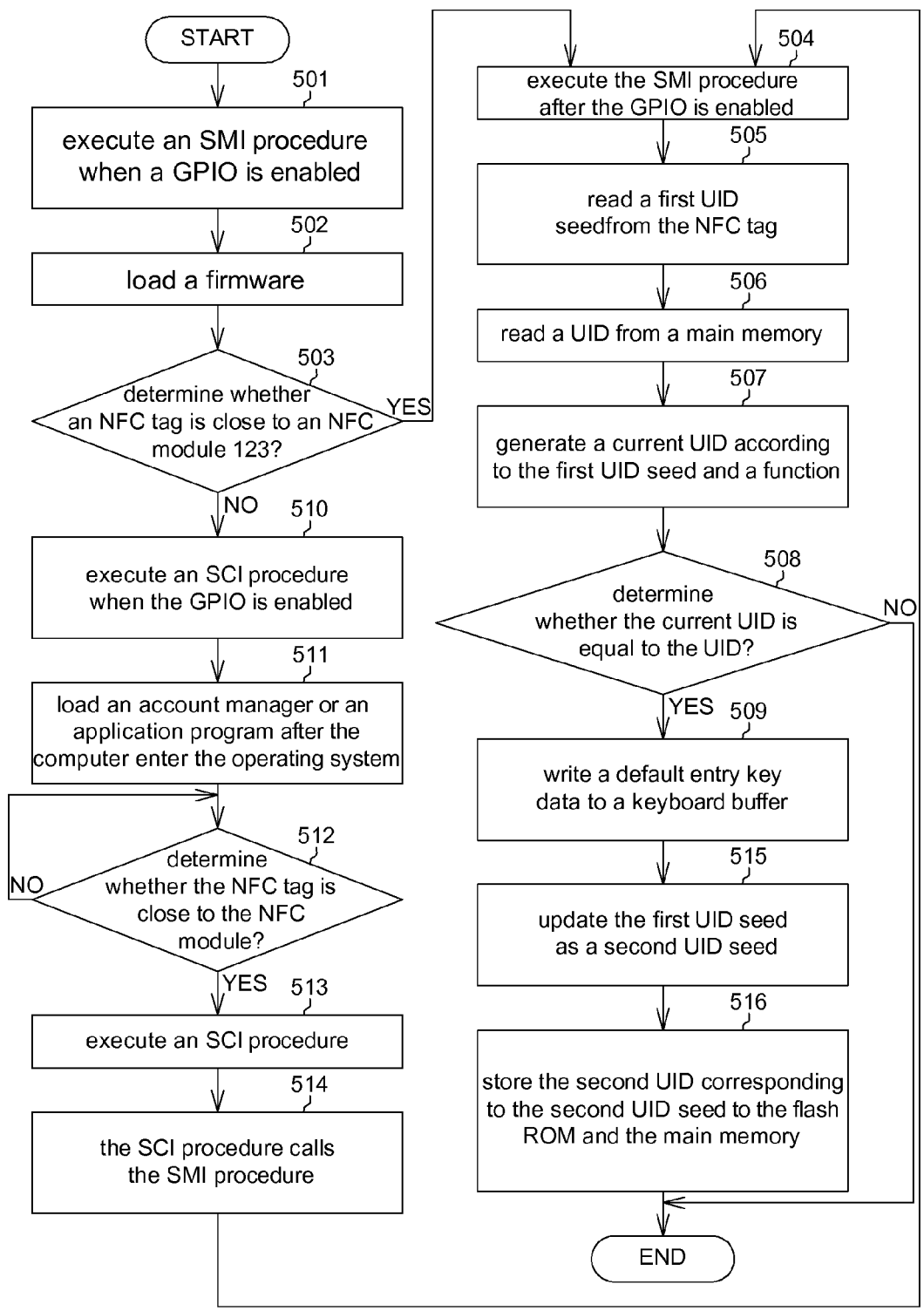
FIG. 6 shows a process of a control method of a computer system according to the second embodiment of the invention.

Referring to FIG. 1, FIG. 2 and FIG. 6. FIG. 6 shows a process of a control method of a computer system according to the second embodiment of the invention. The second embodiment is different from the first embodiment mainly in that the control method of the second embodiment further comprises steps 515 and 516 in addition to steps 501-514. After step 509 is completed, the method may proceed to step 515. In step 515, the CPU 124 updates the first UID seed 111 as a second UID seed. Then, the process proceeds to step 516, the CPU 124 stores the second UID corresponding to the second UID seed to the flash ROM 121 and the main memory 125. The process terminates after step 516 is completed.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer system, comprising:
   a near field communication (NFC) tag used for storing a first user identification (UID) seed; and
   a computer, comprising:
      a main memory;
      a flash read only memory (ROM) used for storing a basic input/output system (BIOS) having a default user identification (UID) and a default entry key data;
      a chipset, comprising:
         a keyboard buffer;
         an NFC module used for reading the first UID seed from the NFC tag when the NFC tag is close to the NFC module; and
      a central processing unit (CPU) used for generating a current UID according to the first UID seed and a function and determining whether the current UID is equal to the UID, wherein the CPU writes the default entry key data to the keyboard buffer if the current UID is equal to the UID, and the CPU further updates the first UID seed as a second UID seed and stores a second UID corresponding to the second UID seed to the flash ROM and the main memory.

2. The computer system according to claim 1, wherein the chipset further comprises a general purpose input/output (GPIO) pin, the NFC module enables the GPIO when the NFC tag is close to the NFC module, and the CPU executes a system management interrupt (SMI) procedure after the GPIO is enabled, such that the NFC module reads a UID seed from the NFC tag.

3. The computer system according to claim 1, wherein the chipset further comprises a GPIO pin, the NFC module enables the GPIO when the NFC tag is close to the NFC module, and the CPU executes a system control interrupt (SCI) procedure to call an SMI procedure after the GPIO is enabled, such that the NFC module reads a UID seed from the NFC tag.

4. The computer system according to claim 1, wherein the default entry key data comprises a hot key, an account and a password of an option ROM code.

5. The computer system according to claim 1, wherein the default entry key data comprises a hot key set by the BIOS.

6. The computer system according to claim 1, wherein the default entry key data comprises an account and a password of an operating system.

7. The computer system according to claim 1, wherein the default entry key data comprises an account and a password of an application program.

8. The computer system according to claim 1, wherein the function is a hash function.

\* \* \* \* \*